United States Patent
Kecht

(10) Patent No.: US 10,479,123 B1
(45) Date of Patent: Nov. 19, 2019

(54) SECURITY FEATURE AND DOCUMENT OF VALUE

(71) Applicant: GIESECKE+DEVRIENT CURRENCY TECHNOLOGY GMBH, Munich (DE)

(72) Inventor: Johann Kecht, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 16/319,570

(22) PCT Filed: Jul. 19, 2017

(86) PCT No.: PCT/EP2017/000879
§ 371 (c)(1),
(2) Date: Jan. 22, 2019

(87) PCT Pub. No.: WO2018/015016
PCT Pub. Date: Jan. 25, 2018

(30) Foreign Application Priority Data

Jul. 20, 2016 (DE) .................. 10 2016 008 804

(51) Int. Cl.
| | |
|---|---|
| *B41M 3/14* | (2006.01) |
| *C09K 11/02* | (2006.01) |
| *B42D 25/29* | (2014.01) |
| *B42D 25/355* | (2014.01) |
| *B42D 25/382* | (2014.01) |
| *C09K 11/08* | (2006.01) |
| *G06K 19/14* | (2006.01) |
| *D21H 21/30* | (2006.01) |
| *C09D 11/02* | (2014.01) |
| *C09C 3/06* | (2006.01) |
| *D21H 21/48* | (2006.01) |

(52) U.S. Cl.
CPC ............ *B41M 3/144* (2013.01); *B42D 25/29* (2014.10); *B42D 25/355* (2014.10); *B42D 25/382* (2014.10); *C09C 3/063* (2013.01); *C09D 11/02* (2013.01); *C09K 11/025* (2013.01); *C09K 11/0838* (2013.01); *C09K 11/0861* (2013.01); *C09K 11/0872* (2013.01); *C09K 11/0888* (2013.01); *D21H 21/30* (2013.01); *D21H 21/48* (2013.01); *G06K 19/14* (2013.01); *C01P 2004/86* (2013.01)

(58) Field of Classification Search
None
See application file for complete search history.

(56) References Cited

U.S. PATENT DOCUMENTS

| | | | |
|---|---|---|---|
| 4,387,112 A * | 6/1983 | Blach .................. | G07F 7/08 283/901 |
| 8,871,299 B2 | 10/2014 | Kecht et al. | |
| 2008/0087189 A1* | 4/2008 | Lin ................... | B41M 3/144 106/31.9 |
| 2008/0163994 A1 | 7/2008 | Hoppe et al. | |
| 2012/0231275 A1* | 9/2012 | Harmia ............ | C09K 11/7769 428/402 |
| 2012/0237668 A1 | 9/2012 | Kecht et al. | |
| 2013/0193346 A1* | 8/2013 | Justel ............... | C09K 11/7733 250/459.1 |
| 2013/0214523 A1* | 8/2013 | Kecht ............... | C09K 11/7701 283/67 |
| 2013/0234043 A1* | 9/2013 | Hussain ............. | G01N 21/643 250/459.1 |
| 2014/0093664 A1 | 4/2014 | Thomas et al. | |

FOREIGN PATENT DOCUMENTS

| | | |
|---|---|---|
| DE | 102004063217 A1 | 7/2006 |
| DE | 102009056634 A1 | 6/2011 |
| DE | 102014011383 A1 | 2/2016 |
| EP | 2172812 A1 | 4/2010 |

OTHER PUBLICATIONS

International Search Report from PCT Application No. PCT/EP2017/000879, dated Sep. 29, 2017.

* cited by examiner

*Primary Examiner* — Scott A Rogers
(74) *Attorney, Agent, or Firm* — Workmann Nydegger

(57) ABSTRACT

The invention relates to a security feature for securing value documents, comprising a chemically unstable inorganic feature substance and a stabilizing component that comprises a substance that stabilizes the feature substance, which substance has at least the same solubility in water as the feature substance to be protected and releases ions when said substance is decomposed, which ions conform to the ions of the feature substance at least in part.

19 Claims, No Drawings

SECURITY FEATURE AND DOCUMENT OF VALUE

BACKGROUND

The invention relates to a security feature for securing value documents, comprising a chemically unstable inorganic feature substance and a substance that stabilizes the feature substance. The invention further relates to a value document having the security feature.

Numerous possibilities for protecting unstable inorganic feature substances are described in the prior art. From DE 10 2004 063 217 A1 and DE 10 2009 056 634 A1 the coating of the unstable inorganic feature substance with a stabilizing envelope is known. However, the additional method step of enveloping is technically complex and cannot be applied to all feature substances. For example, no protection for feature substances that are destroyed by the coating process can be obtained in this way.

Furthermore, feature substances based on unstable inorganic luminescent substances and their protection by three-dimensionally crosslinked adhesive layers in value documents are known for example from the document DE 10 2014 011 383A1. In this case, however, the protection also takes place by means of a type of envelope.

It is the object of the invention to make available an improved security feature for securing value documents and a value document supplied with such a security feature.

This object is achieved by the combinations of features defined in the independent claims. Preferred embodiments are the subject matter of the dependent claims.

SUMMARY OF THE INVENTION

1. First Aspect of the Invention

A security feature for securing value documents, comprising a chemically unstable inorganic feature substance and a stabilizing component comprising a substance that stabilizes the feature substance, said substance having at least the same solubility in water as the feature substance to be protected and releasing ions when said substance is decomposed, which ions conform to the ions of the feature substance at least in part.

Preferably, only one substance stabilizing the feature substance is employed for the stabilizing component. In this case, the stabilizing component and the stabilizing substance are identical. In alternative embodiments, a mixture of different substances is employed as the stabilizing component.

2. Preferred Embodiment

The security feature according to paragraph 1, wherein the substance stabilizing the feature substance is a salt that is composed of cations and anions (i.e. an ionic compound), preferably an inorganic salt.

In a preferred embodiment, the substance stabilizing the feature substance differs from the feature substance in its chemical composition.

The security feature preferably comprises a mixture of a powdered, chemically unstable inorganic feature substance and a likewise powdered substance stabilizing the feature substance. Alternatively, more complicated combination forms can also be used instead of a powder mixture, such as, for example, agglomerates of the unstable feature substance and the substance stabilizing the feature substance.

3. Preferred Embodiment

The security feature according to paragraph 1 or 2, wherein the feature substance is partially soluble in water, i.e. the water solubility at 20° C. amounts to more than 2 mg per liter of water, preferably more than 5 mg per liter of water, particularly preferably more than 20 mg per liter of water, and is optionally unstable with respect to aqueous solutions of acids and/or bases.

4. Preferred Embodiment

The security feature according to any of the paragraphs 1 to 3, wherein the feature substance is unstable with respect to aqueous solutions of acids and/or bases and the instability with respect to aqueous solutions of acids and bases is defined according to the following tests (a) and/or (b), and the substance stabilizing the feature substance has at least the same instability with respect to aqueous solutions of acids and/or bases:

test (a) relating to a feature substance unstable with respect to aqueous solutions of acids: a paper substrate that contains 10 mg of the feature substance or is coated with the feature substance is immersed in 1 liter of a 0.5-molar hydrochloric acid solution at room temperature for 40 minutes, wherein at least 25%, preferably at least 50%, particularly preferably at least 90% of the feature signal or of the feature intensity have to be lost;

test (b) relating to a feature substance unstable with respect to aqueous solutions of bases: a paper substrate that contains 10 mg of the feature substance or is coated with the feature substance is immersed in 1 liter of a 0.5-molar NaOH solution at room temperature for 40 minutes, wherein at least 25%, preferably at least 50%, particularly preferably at least 90% of the feature signal or of the feature intensity have to be lost.

4A. Preferred Embodiment

The security feature according to any of the paragraphs 1 to 3, wherein the combination of the chemically unstable inorganic feature substance and the substance stabilizing the feature substance is stable with respect to aqueous solutions of acids and/or bases, and the stability with respect to aqueous solutions of acids and bases is defined according to the following tests (c), (d) and/or (e):

test (c) relating to a feature substance unstable with respect to aqueous solutions of acids: a paper substrate that contains 10 mg of the feature substance or is coated with the feature substance is immersed in 1 liter of a 0.5-molar hydrochloric acid solution at room temperature for 40 minutes, wherein at most 20%, preferably at most 10%, particularly preferably at most 5% of the feature signal or of the feature intensity may be lost;

test (d) relating to a feature substance unstable with respect to aqueous solutions of bases: a paper substrate that contains 10 mg of the feature substance or is coated with the feature substance is immersed in 1 liter of a 0.5-molar NaOH solution at room temperature for 40 minutes, wherein at most 20%, preferably at most 10%, particularly preferably at most 5% of the feature signal or of the feature intensity may be lost;

test (e) relating to a feature substance unstable with respect to water: a paper substrate that contains 10 mg of the feature substance or is coated with the feature substance is immersed in 1 liter of water at room temperature for 10 h, wherein at most 20%, preferably at most 10%, particularly preferably at most 5% of the feature signal or of the feature intensity may be lost.

4B. Preferred Embodiment

The security feature according to any of the paragraphs 1 to 3A, wherein, in the combination of the chemically unstable inorganic feature substance and the substance stabilizing the feature substance, in water at room temperature less than 2 mg/l, preferably less than 1 mg/l may be dissolved of the chemically unstable inorganic feature substance despite its solubility of more than 2 mg/l.

5. Preferred Embodiment

The security feature according to any of the paragraphs 1 to 4, wherein the substance stabilizing the feature substance is chemically unstable with respect to aqueous solutions of acids and/or bases or has a solubility in water that is higher by at least 50%, more preferably a solubility that is higher by at least 100%, particularly preferably a solubility that is higher by at least 1000% than that of the feature substance.

6. Preferred Embodiment

The security feature according to any of the paragraphs 1 to 5, wherein the feature substance is a luminescent substance, an electroluminescent substance, a magnetic substance or a NIR absorber. Preferably, the substance stabilizing the feature substance is a non-luminescent substance. In the event that the feature substance is a luminescent substance, a luminescence intensity of less than 10%, in particular less than 1%, of the luminescence intensity of the feature substance preferably occurs at the same excitation conditions in the substance stabilizing the feature substance.

7. Preferred Embodiment

The security feature according to paragraph 6, wherein the feature substance is a luminescent substance based on an inorganic host lattice doped with rare earth ions or transition metal ions.

8. Preferred Embodiment

The security feature according to paragraph 6 or 7, wherein the luminescent feature substance emits in the infrared spectral range, preferably in a wavelength range from 700 nm to 3000 nm.

8A. Preferred Embodiment

The security feature according to any of the paragraphs 6 to 8, wherein the feature substance exhibits substantially no upconversion, i.e. the proportion of the intensity of the anti-Stokes emission amounts to less than 10% relative to the proportion of the intensity of the Stokes emission.

9. Preferred Embodiment

The security feature according to any of the paragraphs 1 to 8, wherein the feature substance has a particle size (D99) of less than 20 μm, preferably less than 12 μm, particularly preferably less than 5 μm. Further, the feature substances, in particular the luminescent substances, have a particle size (D99) of more than 1 μm, particularly preferably of more than 2 μm.

10. Preferred Embodiment

The security feature according to any of the paragraphs 1 to 9, wherein the stabilizing component has at most the same particle size D99 as the feature substance, preferably a particle size which is at least 10%, preferably at least 20%, particularly preferably at least 50%, smaller than the particle size D99 of the feature substance.

11. Preferred Embodiment

The security feature according to any of the paragraphs 1 to 10, wherein the chemically unstable inorganic feature substance contains alkali metal and/or alkaline earth cations as cations.

12. Preferred Embodiment

The security feature according to paragraph 11, wherein the substance stabilizing the feature substance contains alkali metal and/or alkaline earth cations as cations, preferably the same alkali metal and/or alkaline earth cations as the feature substance.

13. Preferred Embodiment

The security feature according to any of the paragraphs 1 to 12, wherein the chemically unstable inorganic feature substance contains sulfates, phosphates, tungstates, molybdates, chromates, titanates, stannates or silicates as anions.

14. Preferred Embodiment

The security feature according to paragraph 13, wherein the substance stabilizing the feature substance contains sulfates, phosphates, tungstates, molybdates, chromates, titanates, stannates or silicates as anions, preferably the same anions as the feature sub stance.

15. Preferred Embodiment

The security feature according to any of the paragraphs 1 to 14, wherein the stabilizing substance is present in a weight ratio with reference to the feature substance of at least 0.5 to 1, preferably at least 1 to 1, further preferably at least 2 to 1, particularly preferably at least 10 to 1.

16. Preferred Embodiment

The security feature according to any of the paragraphs 1 to 15, wherein the particle surface of the stabilizing substance relative to the particle surface of the feature substance in the security feature amounts to at least 0.5 to 1, preferably at least 1 to 1, further preferably at least 10 to 1, particularly preferably at least 100 to 1.

17. (Second aspect of the invention) A value document, in particular a banknote, comprising the security feature according to any of the paragraphs 1 to 16.

18. Preferred Embodiment

The value document according to paragraph 17, wherein the value document is based on a paper substrate and the security feature is added to the paper stock, preferably is homogeneously distributed in the paper substrate.

19. Preferred Embodiment

The value document according to paragraph 17, wherein the security feature is present in a localized manner at a specific location of the value document, for example by means of incorporation in a certain security element such as a mottling fiber, a security thread, a security strip or a security patch, or by means of printing the value document with a printing ink containing the security feature.

DETAILED DESCRIPTION OF THE PREFERRED EMBODIMENTS

Value documents within the scope of the invention are objects such as banknotes, checks, shares, tokens, identity cards, passports, credit cards, deeds and other documents, labels, seals, and objects to be secured such as, for example, jewelry, cosmetics, CDs, packagings, bottles, flacons and the like. The value document substrate does not necessarily have to be a paper substrate; it could in particular be a plastic substrate or a substrate that has both paper constituents and plastics constituents.

A chemically unstable inorganic feature substance, for example a luminescent substance, is unstable with respect to acids and/or bases and/or has a non-negligible water solubility when present in the unprotected state. Through combination with a stabilizing component that comprises at least one substance stabilizing the feature substance, however, the instability can be completely or partially eliminated in order to obtain a security feature with sufficient stability for use in value documents, for example banknotes. This is achieved by the stabilizing substance having a similar solubility or a greater solubility than the feature substance to be protected and releasing ions when said substance is decomposed, which ions conform to the ions of the feature substance completely or in part. An increase of the concentration of matching ions in the vicinity of the feature substance reduces or prevents its dissolution. This effect is based on the saturation of the surrounding environment and on the influence of the equilibrium reaction on the basis of the solubility product applicable to the decomposition of the respective feature substance. By suitable choice, for example of the substance type, the solubility, the particle size and the quantity of the stabilizing additive, it is possible to use unstable feature substances for the security features according to the invention that would not be suitable for use in value documents, for example banknotes, as a pure substance.

The present invention is further characterized in that stabilized security features can be achieved entirely without an additional envelope.

The chemically unstable inorganic feature substances can be based, for example, on luminescent substances, on magnetic substances or on NIR absorbers. The luminescent substances include, in particular, photoluminescent substances, electroluminescent substances, upconverters and downconverters. As chemically unstable inorganic feature substances, luminescent substances are preferred, in particular luminescent substances based on inorganic host lattices doped with rare earth ions or with transition metal ions. The luminescent substances preferably have luminescence emissions in the infrared spectral range from 700 nm to 3000 nm.

According to a preferred embodiment, the luminescent substances exhibit substantially no upconversion, i.e. the proportion of the intensity of the anti-Stokes emission amounts to less than 10%, preferably less than 1%, particularly preferably less than 0.1%, relative to the proportion of the intensity of the Stokes emission.

According to a further preferred embodiment, the feature substances, in particular the luminescent substances, have a particle size (D99) of less than 20 µm, preferably less than 12 µm, particularly preferably less than 5 µm. The value "D99" describes the particle diameter, for which 99% of all particles have a smaller volume, and is a common measurand for evaluating the particle sizes of particles.

According to a further preferred embodiment, the feature substances, in particular the luminescent substances, have a particle size (D99) of more than 2 µm.

According to a preferred embodiment, the "chemically unstable feature substances" are feature substances that have a pronounced water solubility, i.e. the water solubility (at 20° C.) amounts to more than 2 mg per liter of water, preferably more than 5 mg per liter of water, particularly preferably more than 20 mg per liter of water. Such feature substances are suitable for use only to a limited extent in unprotected form. For example, a single banknote with a security imprint of the size of 2 $cm^2$ at 15% pigmentation of the printing ink with the feature substance and at 2 $g/m^2$ weight per unit area of the print sample contains approximately 0.06 mg of the security pigment employed. Even in the case of a low solubility of only 2 mg per liter, it would thus be possible to completely dissolve the entire pigment content of a bundle of more than 30 banknotes through contact with one liter of water. Contacts with larger quantities of water arise, for example, by unintentionally washing the banknotes in the washing machine. Even upon contact with a small quantity of water, for example rain, air humidity or finger sweat, unstable feature substances can be destroyed completely or in part.

Furthermore, feature substances with pronounced water solubility usually exhibit a particularly high instability with respect to aqueous acids and bases. The solubility of such feature substances can be partially increased by orders of magnitude by changing the pH value. The security features according to the invention can reduce the destruction of the unstable feature substance in this case as well. Examples of unintentional contacts of value documents with aqueous acidic or basic solutions are, for example, contact with sweat, detergents, soaps, foods or with chemical components during processing, for example printing inks or mineral acids.

According to the present invention, an improved security feature is made available in that the feature substance preferably present in powdered form is treated with at least one further substance preferably present in powdered form as a stabilizing component and is thereby protected against harmful influences by water and/or aqueous acids and bases. The stabilizing component thus stabilizes the feature substance. The feature substance forms an unstable security feature in the absence of the additional stabilizing component, thus is unstable with respect to water, acids or bases. In the presence of the additional stabilizing component, the feature substance forms a security feature with significantly improved stability with respect to water, acids or bases under the same test conditions.

The stabilizing component is at least one substance that has a water solubility that is similar to or greater than that of the feature substance to be protected, in particular a similar or greater instability with respect to acids or bases. It is achieved thereby that the stabilizing component dissolves prematurely or simultaneously with the feature substance. If the stabilizing component is chosen expediently, during the dissolution thereof, the local concentration of those ions is increased that are also involved in the dissolution process of the feature substance. In this way, the equilibrium of the reaction of the dissolution process is shifted in favor of the feature substance by means of the mass-action law or the solubility product of the feature substance. The feature substance thus dissolves more slowly or it stops dissolving completely. This influence can be further increased by additional adjustments, for example of the quantity and the particle size of the stabilizing component. This is associated with the improved kinetics of the dissolution process with a greater surface.

For better understanding of the present invention, the following fictitious example is used:

The dissolution of an arbitrarily chosen feature substance AB is illustrated by the following equilibrium reaction, in which the two arrows represent the forward and the reverse reaction:

$$AB \leftarrow\rightarrow A^+ + B^-$$

The fictitious solubility product of the above feature substance is, for example:

$$K_L = [A]*[B] = 9*10^{-6} \text{ mol}^2/\text{l}^2$$

When only the substance AB is present and dissolves, there applies

"dissolved quantity $AB$" = $[A] = [B]$ and thus $[A]^2 = 9*10^{-6}$ mol$^2$/l$^2$ and $[A] = 3*10^{-3}$ mol/l In the case of a molecular weight of the substance AB of 100 g/mol, 300 mg of the substance dissolve in 1 liter of water in equilibrium.

When a soluble stabilizing component CB is added, however, the concentration [B] is strongly increased:

$$CB \rightarrow C^+ + B^-$$

As a result, the equilibrium is influenced during the dissolution of AB.

When the concentration [B] is therefore, for example, $3*10^{-1}$ mol/l, of the substance AB there dissolves only:

$$[A] = K_L/[B] = (9*10^{-6} \text{ mol}^2/\text{l}^2)/(3*10^{-1} \text{ mol/l}) = 3*10^{-5} \text{ mol/l}$$

The solubility of the feature AB thus falls by a factor of 100 compared to the case without the additional stabilizing component. The effect is significantly intensified since the concentration locally, for example within the paper substrate of the banknote, can be strongly increased, and it takes longer until the ions have distributed far enough and a global average concentration is formed in the entire aqueous solution.

According to a preferred embodiment, the unstable inorganic feature substances are compounds which contain alkali metal or alkaline earth cations, i.e. for example the elements Li, Na, K, Rb, Cs, Mg, Ca, Sr or Ba. These elements often exhibit a weak interaction with the crystal lattice and therefore often form substances having a pronounced water solubility and/or insufficient chemical stability with respect to acids and bases.

In this case, the stabilizing component is preferably a compound which likewise contains alkali metal or alkaline earth cations. In particular, it is preferred that the stabilizing component contains the same alkali metal or alkaline earth cations as the feature substance.

According to a further preferred embodiment, the unstable inorganic feature substances are compounds which contain sulfates, phosphates, tungstates, molybdates, chromates, titanates, stannates or silicates, particularly preferably sulfates or phosphates, as anions. Such compounds are often unstable in the case of pH value changes, since the solution equilibrium is influenced by protonation of the anionic groups.

In this case, the stabilizing component is preferably an inorganic compound which likewise contains sulfates, phosphates, tungstates, molybdates, chromates, titanates, stannates or silicates, preferably sulfates or phosphates, as anions, and particularly preferably contains the same anions as the feature substance out of the specified ones.

According to a further preferred embodiment, the unstable inorganic feature substances are compounds which contain alkali metal or alkaline earth cations and at the same time sulfates, phosphates, tungstates, molybdates, chromates, titanates, stannates or silicates, particularly preferably sulfates or phosphates, as anions.

It is preferred that the stabilizing component in this case is a compound which contains either alkali metal or alkaline earth cations, or which contains sulfates, phosphates, tungstates, molybdates, chromates, titanates, stannates or silicates, particularly preferably sulfates or phosphates, as anions. In particular, it is preferred that the stabilizing component in this case is a compound which contains both alkali metal or alkaline earth cations and sulfates, phosphates, tungstates, molybdates, chromates, titanates, stannates or silicates, particularly preferably sulfates or phosphates, as anions.

According to a further preferred embodiment, the stabilizing component comprises several stabilizing substances. For example a first stabilizing substance which contains alkali metal or alkaline earth cations, and a second stabilizing substance which contains sulphates, phosphates, tungstates, molybdates, chromates, titanates, stannates or silicates, particularly preferably sulfates or phosphates, as anions.

It should be mentioned that also several stable compounds exist which are made up of the specified preferred cations and anions. For example, the compounds $LiNbO_3$, $KTiOPO_4$ or $YPO_4$ do contain alkali metals and/or phosphate groups, but are not pronouncedly water-soluble without the aid of further additives, for example fluorides or other salts, or without the aid of elevated pressure or temperature. Corresponding compounds can thus be used in security elements independently of a stabilizing component, for example in the form of luminescent substances or other feature substances, and are thus not part of this invention.

According to a preferred embodiment, the feature substance is a luminescent substance having an inorganic host lattice having a doping with rare earth ions as a luminescence emitter. Such feature substances offer further technical advantages, for example they have particularly sharp-band, specific emission lines, as a result of which they can be employed particularly well for the spectral coding of security features. However, the technical disadvantage is that certain host lattices that are capable of forming luminescent substances having particularly characteristic emission spectra, have a very poor stability and can therefore not be used as a security feature without additional stabilization. This disadvantage can be eliminated by the security features according to the invention.

According to a further preferred embodiment, the feature substance is a luminescent substance having an inorganic host lattice having a doping with transition metal ions as luminescence emitter. Such feature substances offer further technical advantages, for example they have characteristic luminescence spectra, which do not conform to those of the corresponding rare-earth-doped compounds. However, the technical disadvantage is that suitable host lattices that are capable of forming luminescent substances having transition metal dopings, often have a very poor stability and can therefore not be used as a security feature without additional stabilization. This disadvantage can be eliminated by the security features according to the invention.

Since the stabilizing component is to dissolve instead of the feature substance, it must be present in a sufficient quantity. The stabilizing component is present in the security feature in a weight ratio relative to the feature substance of at least 0.5:1, preferably at least 1:1, further preferably at least 2:1, particularly preferably at least 10:1.

The speed at which ions are discharged into the surrounding solution, when the solubility is similar, is dependent primarily on the available free surface of the particles, i.e. both the quantity and the particle size of the particles play a role. The particle surface of the stabilizing component relative to the particle surface of the feature substance in the security feature amounts to at least 0.5:1, preferably at least 1:1, further preferably at least 10:1, particularly preferably at least 100:1.

According to a preferred embodiment, the stabilizing component and the feature substance have a substantially equal particle size, i.e. the particle size of the two substances differs by less than 10%.

According to a further preferred embodiment, the stabilizing component and the feature substance have significantly different particle sizes, i.e. the stabilizing component has a particle size that is at least 10%, preferably at least 20%, particularly preferably at least 50%, smaller than the particle size of the feature substance.

According to a preferred embodiment, the stabilizing component and the feature substance have a substantially identical solubility, i.e. the solubility of the two substances differs by less than 10%.

According to a further preferred embodiment, the stabilizing component has a higher solubility than the feature substance, preferably a solubility higher by 50%, further preferably a solubility higher by 100%, particularly preferably a solubility higher by 1000%, than the feature substance.

According to a preferred embodiment, the security features according to the invention are added to the paper stock and are distributed homogeneously in the paper of the value document.

According to a further preferred embodiment, the security features according to the invention are arranged in a localized manner at certain locations of the value document, for example by incorporation into certain security elements such as mottling fibers, security threads or holograms or by printing the value document with printing lacquers that contain the security feature.

According to a preferred embodiment, the security feature contains, in addition to the unstable feature substance and the stabilizing component, further substances, for example further (stable) feature substances or further (non-stabilizing) components.

The invention is explained below on the basis of special embodiment examples.

Example 1

$Ca_3(PO_4)_2$:Yb,Er is used as the feature substance, a luminescent substance that can be excited with infrared radiation of the wavelength 980 nm and that luminesces in the range of 1500 nm to 1600 nm. The particle size (D99) is 5 µm. Due to the water solubility of 20 mg/l and its instability with respect to aqueous acids, however, the unprotected feature substance is not suitable for securing value documents. If the unprotected feature substance is introduced as a security feature into a security element such as, for example, a mottling fiber, it can be destroyed by moisture or acidic solutions penetrating into the mottling fiber.

By combining the feature substance with a stabilizing component, however, a security feature with advantageous properties can be produced.

$Ca_3(AsO_4)_2$ is used as the stabilizing component. In comparison to $Ca_3(PO_4)_2$, it has a solubility that is approximately twice as high and releases calcium ions during dissolution, which hinder the dissolution of the $Ca_3(PO_4)_2$. The particle size is 2 µm, and the weight ratio of the mixture $Ca_3(AsO_4)_2/Ca_3(PO_4)_2$ amounts to 2:1. As a result, the surface of the $Ca_3(AsO_4)_2$ particles in the security feature is significantly greater than that of the $Ca_3(PO_4)_2$ particles.

When security elements such as, for example, mottling fibers are produced of the feature substance with the stabilizing component, thus, in comparison to mottling fibers having the pure feature substance, they exhibit a significantly greater stability with respect to moisture and to aqueous acid solutions.

When, for example, a sheet containing mottling fibers having the pure feature substance is treated with hydrochloric acid solution analogously to test (c), the luminescence intensity of the fibers is reduced by more than 50%. When, on the other hand, mottling fibers are employed that contain the feature substance with the stabilizing component, the luminescence intensity is reduced by less than 10%. The reduction of the luminescence intensity upon contact with water and base analogously to test (d) and test (e) is likewise less than 10%.

Example 2

$BaSO_4$:$Mn^{6+}$ is used as the feature substance, a luminescent substance that exhibits a broad luminescence in the infrared of 900 nm to 1300 nm when excited with light of the wavelength 550 nm. The particle size (D99) is 3 µm. In comparison to the feature substance from example 1, the water solubility is significantly lower at 2.5 mg/l, however, the solubility is high enough to be disadvantageous upon direct contact with a large quantity of water (e.g. when introduced directly into the paper stock, or when the value document falls into water) or upon direct contact with aqueous acids and bases.

$SrSO_4$ is used as the stabilizing component, which has a significantly higher solubility of 132 mg/l and releases sulfate ions during dissolution, which hinder the dissolution of $BaSO_4$. The particle size is likewise 3 µm. The weight ratio of the mixture of $SrSO_4$:$BaSO_4$ in the security feature amounts to 3:1. When the security feature is used for securing value documents, for example by direct introduction into the paper stock during paper production or by printing of the value paper, it exhibits a significantly greater stability with respect to water or aqueous acids and bases than the pure feature substance.

When, for example, a sheet containing the pure feature substance is treated with hydrochloric acid solution analogously to test (c), the luminescence intensity of the sheet is reduced by more than 25%. When, instead, the feature substance is used together with the stabilizing component, the luminescence intensity is reduced by less than 5%. The reduction of the luminescence intensity upon contact with water and base analogously to test (d) and test (e) is likewise less than 5%.

Example 3

$Li_3PO_4:Cr^{5+}$ is used as the feature substance, a luminescent substance that exhibits a broad luminescence in the infrared of 900 to 1300 when excited with light of the wavelength 550 nm. The particle size (D99) is 5 μm. The water solubility amounts to 390 mg/l and the feature substance is unstable with respect to aqueous acids. When the unprotected feature substance is introduced, for example, into a hydrophobic printing lacquer and printed onto a value document, thus, the feature substance is initially protected by the cured printing lacquer. In the further course of time or through signs of wear, however, micro cracks or similar defects occur in the print, which lead to moisture (or aqueous acids and bases) being able to reach and destroy the feature substance.

$Li_3PO_4$ is used as the stabilizing component, which has substantially the same solubility as the feature substance. The particle size is 2 μm and the weight ratio of the stabilizing component and the feature substance in the security feature amounts to 10:1. Through the significantly higher quantity and the smaller particle size, the $Li_3PO_4$ of the stabilizing component is initially dissolved significantly more quickly and saturates the surrounding solution with lithium ions and phosphate ions, thereby preventing a dissolution of the feature substance.

When the security feature is introduced into a printing lacquer and a value document is printed therewith, the print exhibits a significantly greater stability with respect to penetrating moisture or aqueous acids and bases than a print with the pure feature substance.

When, for example, a print sample that contains the pure feature substance is treated with hydrochloric acid solution analogously to test (c), the luminescence intensity of the print sample is reduced by more than 50%. When, instead, the feature substance is used together with the stabilizing component, the luminescence intensity is reduced by less than 10%. The reduction of the luminescence intensity upon contact with water and base analogously to test (d) and test (e) is likewise less than 10%.

The invention claimed is:

1. A security feature for securing value documents, comprising a chemically unstable inorganic feature substance and a stabilizing component comprising a substance that stabilizes the feature substance, said substance having at least the same solubility in water as the feature substance to be protected and releasing ions when said substance is decomposed, which ions conform to the ions of the feature substance at least in part.

2. The security feature according to claim 1, wherein the substance stabilizing the feature substance is a salt that is composed of cations and anions, including an inorganic salt.

3. The security feature according to claim 1, wherein the feature substance is partially soluble in water, i.e. the water solubility at 20° C. amounts to more than 2 mg per liter of water, and is optionally unstable with respect to aqueous solutions of acids and/or bases.

4. The security feature according to claim 1, wherein the feature substance is unstable with respect to aqueous solutions of acids and/or bases and the instability with respect to aqueous solutions of acids and bases is defined according to the following tests (a) and/or (b), and the substance stabilizing the feature substance has at least the same instability with respect to aqueous solutions of acids and/or bases:

test (a) relating to a feature substance unstable with respect to aqueous solutions of acids: a paper substrate that contains 10 mg of the feature substance or is coated with the feature substance is immersed in 1 liter of a 0.5-molar hydrochloric acid solution at room temperature for 40 minutes, wherein at least 25% of the feature signal or of the feature intensity have to be lost;

test (b) relating to a feature substance unstable with respect to aqueous solutions of bases: a paper substrate that contains 10 mg of the feature substance or is coated with the feature substance is immersed in 1 liter of a 0.5-molar NaOH solution at room temperature for 40 minutes, wherein at least 25% of the feature signal or of the feature intensity have to be lost.

5. The security feature according to claim 1, wherein the substance stabilizing the feature substance is chemically unstable with respect to aqueous solutions of acids and/or bases or has a solubility in water that is higher by at least 50% than that of the feature substance.

6. The security feature according to claim 1, wherein the feature substance is a luminescent substance, an electroluminescent substance, a magnetic substance or a NIR absorber.

7. The security feature according to claim 6, wherein the feature substance is a luminescent substance based on an inorganic host lattice doped with rare earth ions or transition metal ions.

8. The security feature according to claim 6, wherein the luminescent feature substance emits in the infrared spectral range, in a wavelength range from 700 nm to 3000 nm.

9. The security feature according to claim 1, wherein the feature substance has a particle size of less than 20 μm.

10. The security feature according to claim 1, wherein the stabilizing component has at most the same particle size as the feature substance, a particle size which is at least 10% smaller than the particle size of the feature substance.

11. The security feature according to claim 1, wherein the chemically unstable inorganic feature substance contains alkali metal and/or alkaline earth cations as cations.

12. The security feature according to claim 11, wherein the substance stabilizing the feature substance contains alkali metal and/or alkaline earth cations as cations, the same alkali metal and/or alkaline earth cations as the feature substance.

13. The security feature according to claim 1, wherein the chemically unstable inorganic feature substance contains sulfates, phosphates, tungstates, molybdates, chromates, titanates, stannates or silicates as anions.

14. The security feature according to claim 13, wherein the substance stabilizing the feature substance contains sulfates, phosphates, tungstates, molybdates, chromates, titanates, stannates or silicates as anions, the same anions as the feature substance.

15. The security feature according to claim 1, wherein the stabilizing substance is present in a weight ratio with reference to the feature substance of at least 0.5 to 1.

16. The security feature according to claim 1, wherein the particle surface of the stabilizing substance relative to the particle surface of the feature substance in the security feature amounts to at least 0.5 to 1.

17. A value document, in particular a banknote, comprising the security feature according to claim 1.

18. The value document according to claim 17, wherein the value document is based on a paper substrate and the security feature is added to the paper stock, is homogeneously distributed in the paper substrate.

19. The value document according to claim 17, wherein the security feature is present in a localized manner at a specific location of the value document, for example by means of incorporation in a certain security element such as a mottling fiber, a security thread, a security strip or a security patch, or by means of printing the value document with a printing ink containing the security feature.

\* \* \* \* \*